(12) United States Patent
Cahoon et al.

(10) Patent No.: US 9,000,972 B1
(45) Date of Patent: Apr. 7, 2015

(54) SYSTEM AND METHOD FOR ENABLING DISPLAY OF VERTICAL WEATHER INFORMATION ON AN AIRCRAFT HORIZONTAL WEATHER DISPLAY

(75) Inventors: James D. Cahoon, Melbourne, FL (US); Patricia R. Barbosa, Rockledge, FL (US); Alexander M. Oranskiy, Melbourne, FL (US); Mark B. Godfrey, Melbourne, FL (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 352 days.

(21) Appl. No.: 13/246,785

(22) Filed: Sep. 27, 2011

(51) Int. Cl.
*G01S 13/95* (2006.01)
*G01S 13/89* (2006.01)

(52) U.S. Cl.
CPC .............. *G01S 13/95* (2013.01); *G01S 13/89* (2013.01); *G01S 13/953* (2013.01)

(58) Field of Classification Search
CPC ....... G01S 13/953; G01S 13/951; G01S 7/04; G01S 13/86; G01S 13/95
USPC ............................. 342/26 B, 26 R, 176, 191
See application file for complete search history.

(56) References Cited

U.S. PATENT DOCUMENTS

| | | | |
|---|---|---|---|
| 4,940,987 A * | 7/1990 | Frederick | 342/26 D |
| 5,839,080 A | 11/1998 | Muller et al. | |
| 6,188,960 B1 * | 2/2001 | Baron et al. | 702/3 |
| 6,289,277 B1 | 9/2001 | Feyereisen et al. | |
| 6,826,458 B2 * | 11/2004 | Horvath et al. | 701/3 |
| 6,879,280 B1 * | 4/2005 | Bull et al. | 342/26 B |
| 7,307,577 B1 | 12/2007 | Kronfeld et al. | |
| 7,411,541 B2 * | 8/2008 | Khatwa | 342/26 R |
| 7,427,943 B1 | 9/2008 | Kronfeld et al. | |
| 7,733,264 B1 * | 6/2010 | Woodell et al. | 342/26 B |
| 8,111,186 B2 * | 2/2012 | Bunch et al. | 342/26 B |
| 8,223,063 B2 * | 7/2012 | Kelly et al. | 342/26 R |
| 8,319,679 B2 * | 11/2012 | Christianson | 342/26 B |
| 2004/0239558 A1 * | 12/2004 | Geier et al. | 342/357.06 |

OTHER PUBLICATIONS

Kuntman, D., Satellite Imagery: Predicting aviation weather hazards, ICAO Journal, vol. 55, Mar. 2000, 4 pps.
RDR-4B Honeywell User Manual for Forward Looking Windshear Detection/Weather Radar System, Rev. 6, Jul. 2003, 106 pps.

* cited by examiner

*Primary Examiner* — John B Sotomayor
*Assistant Examiner* — Marcus Windrich
(74) *Attorney, Agent, or Firm* — Angel N. Gerdzhikov; Donna P. Suchy; Daniel M. Barbieri (57) ABSTRACT

A system for displaying vertical weather information on an aviation display aboard an aircraft, the aircraft including an aircraft radar system for scanning a target, is provided. The system includes processing electronics configured to receive a target selection from a user input device, to receive an altitude value of an echo top of the target based on radar return data, and to cause the altitude value to be displayed on plan view of weather images on an aviation display in response to the received target selection.

20 Claims, 8 Drawing Sheets

SYSTEM AND METHOD FOR ENABLING DISPLAY OF VERTICAL WEATHER INFORMATION ON AN AIRCRAFT HORIZONTAL WEATHER DISPLAY

BACKGROUND

The present disclosure relates generally to the field of airborne radar systems. The present disclosure relates more specifically to the field of depiction of vertical weather information on an aircraft horizontal weather display.

In general, airborne weather radar systems display weather radar return information in plan view on a horizontal weather display. In deciding whether to fly around or climb over a weather cell, a pilot may want vertical information about the cell. Some advanced systems provide a profile or elevation view of weather radar returns on a vertical situation display; however, due to cost or lack of space for an additional display, many aircraft do not have a vertical situation display. Thus, there is a need to provide an improved aviation system for displaying vertical weather information on a horizontal weather display.

SUMMARY

One embodiment relates to a system for displaying vertical weather information on an aviation display aboard an aircraft, the aircraft including an aircraft radar system for scanning a target. The system includes processing electronics configured to receive a target selection from a user input device, to receive an altitude value of an echo top of the target based on radar return data, and to cause the altitude value to be displayed on plan view of weather images on an aviation display in response to the received target selection.

Another embodiment relates to a method for displaying vertical weather information on an aircraft horizontal weather display. The method includes receiving a weather cell selection from a user input device and generating, in response to the weather cell selection, an image including an altitude value of an echo top of a weather cell and a plan view of weather generated from radar return data.

Another embodiment relates to one or more computer readable media having instructions stored therein, the instructions being executable by one or more processors to execute a method of displaying echo top information on an aviation display. The method includes receiving a location information from a user interface, receiving an altitude value of an echo top of a weather cell corresponding to the location information, and generating an image showing the altitude value and a plan view of weather.

DETAILED DESCRIPTION

Referring to the FIGURES, systems and methods for enabling display of vertical weather information on an aircraft horizontal weather display are described, according to an exemplary embodiment. An airborne weather radar system is generally configured to project radar beams and to receive radar returns relating to the projected radar beams. The projected radar beams generally pass through air and reflect off of precipitation (e.g., rain, snow, etc.), other aircraft, and terrain (e.g., a mountain, a building, etc.). An airborne weather radar system may be configured to scan weather at various angles relative to horizontal and to determine the altitude of an echo top of a cell. The echo top is the highest part of the cell having a reflectivity above a certain signal to noise ratio (e.g., 18.5 dBZ) and is usually associated with the top of the precipitation within a cell, which in turn usually correlates to the strength of the cell. It should be noted that the actual or visual top of the cell may be higher than the echo top; however, most pilots are more concerned with the echo top than the visual top, as the clouds above the echo top of the cell tend to be whispy and/or of little threat to the aircraft.

Weather radar systems are typically configured to display radar return information in plan view on a horizontal weather display. Generally, the systems and methods described below generate an image including a plan view of the weather and an altitude value of an echo top of a weather cell. According to an exemplary embodiment, a user may select or identify a cell via a user interface device (e.g., cursor control device, touchscreen, etc.). The selected cell defines a target, which is then scanned by the weather radar system to determine the echo top of the cell. Processing electronics aboard the aircraft generate an image of a plan view of the weather with the altitude of the echo top of the weather cell shown in a region of the plan view corresponding to the location of the weather cell. According to another embodiment, the radar system may track the weather cell, and the processing electronics may be configured to generate an updated image including an updated echo top altitude in response to the updated radar return data.

Figure 1:
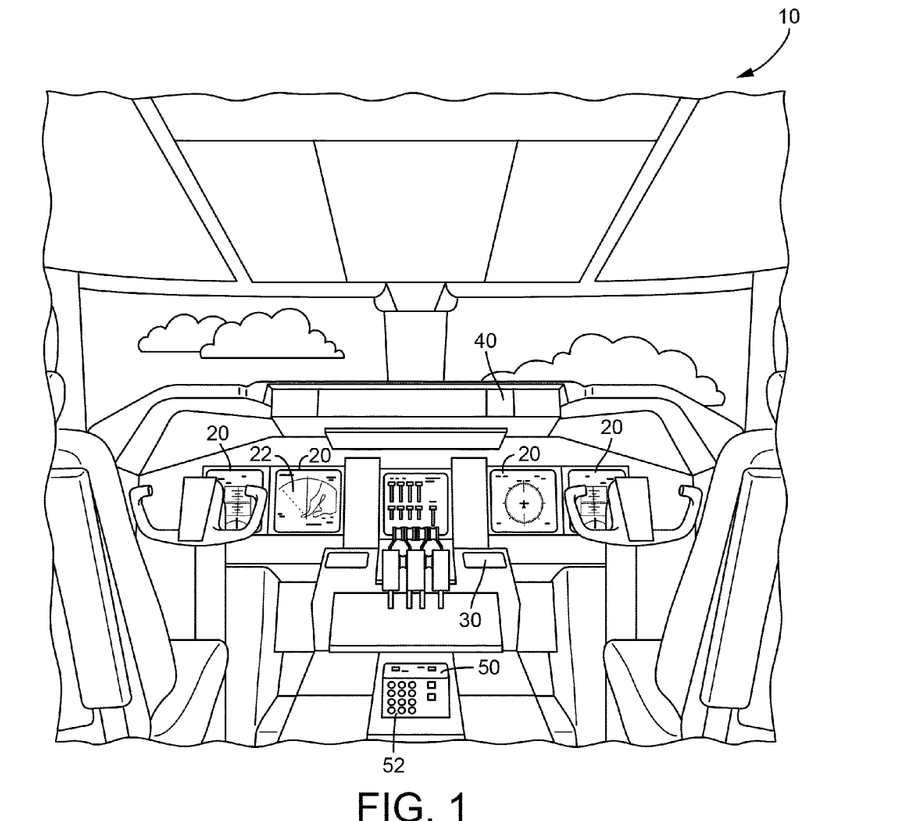
FIG. 1 is a schematic illustration of an aircraft control center, according to an exemplary embodiment.

Referring now to FIG. 1, an illustration of an aircraft control center or cockpit 10 is shown, according to an exemplary embodiment. Aircraft control center 10 includes flight displays 20 which are generally used to increase visual range and to enhance decision-making abilities. In an exemplary embodiment, flight displays 20 may provide an output from a radar system of the aircraft. For example, flight displays 20 may provide a top-down view, a horizontal view, or any other view of weather and/or terrain detected by a radar system on the aircraft. The views of weather may include monochrome or color graphical representations of the weather. Graphical representations of weather may include an indication of altitude of those objects or the altitude relative to the aircraft. Flight displays 20 may further include a touch sensitive surface 22 configured to receive touch gestures relative to the images shown on display 20. Aircraft control center 10 may further include other user interface elements such as an audio device 30 (e.g., speaker, electro-acoustic transducer, voice command recognition device, etc.), illuminating or flashing lamps 40, and a cursor control device 50. Cursor control device 50 may include knobs and buttons configured to move a cursor on display 20, navigate through lists of information, and to make selections. The buttons of cursor control device 50 may constitute a keypad 52 configured to enable a user to type information for entry into the processing electronics system, for example, to enter latitudinal and longitudinal coordinates.

Figure 2:
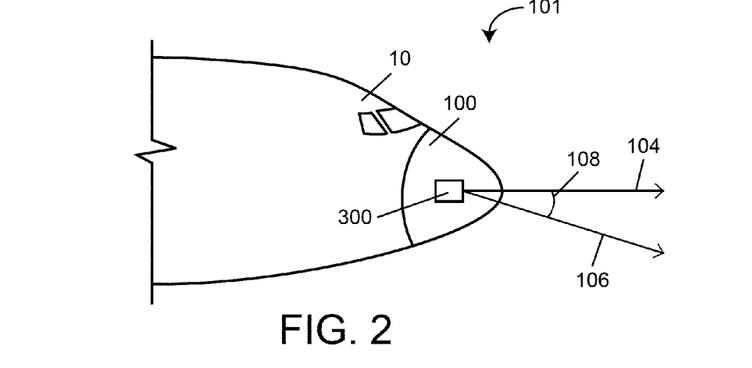
FIG. 2 is a schematic illustration of the nose of an aircraft including a weather radar system, according to an exemplary embodiment.

Referring to FIG. 2, the front of an aircraft 101 is shown with aircraft control center 10 and nose 100, according to an exemplary embodiment. A radar system 300 (e.g., a weather radar system or other radar system) is generally located within nose 100 of aircraft 101 or within aircraft control center 10 of aircraft 101. According to various exemplary embodiments, radar system 300 may be located on the top of aircraft 101 or on the tail of aircraft 101 instead. Radar system 300 may include or be coupled to an antenna system. A variety of different antennas or radar systems may be used with the present invention (e.g., a split aperture antenna, a monopulse antenna, a sequential lobbing antenna, etc.).

Radar system 300 generally works by sweeping a radar beam horizontally back and forth across the sky. Some radar systems will conduct a first horizontal sweep 104 directly in front of aircraft 101 and a second horizontal sweep 106 upward or downward at some tilt angle 108 (e.g., 20 degrees down). Returns from different tilt angles can be electronically merged to form a composite image for display on an electronic display shown, for example, in FIG. 1. Returns can also be processed to, for example, distinguish between terrain and weather, to determine the height of terrain, or to determine the height of weather. Radar system 300 may be a WXR-2100 MultiScan™ radar system or similar system manufactured by Rockwell Collins. According to other embodiments, radar system 300 may be an RDR-4000 system or similar system manufactured by Honeywell International, Inc. Radar system 300 may include a terrain awareness and warning system (TAWS) and coordinate with associated user interface elements in aircraft control center 10 (e.g., flashing lights 40, displays 20, display elements on a weather radar display, display elements on a terrain display, audio alerting devices 30, etc.) configured to warn the pilot of potentially threatening terrain features.

Figure 3:
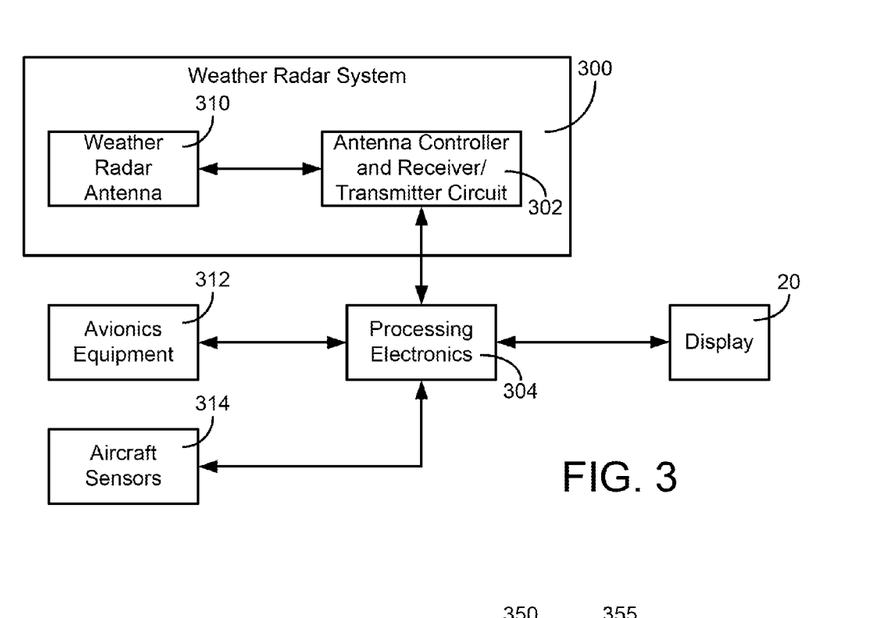
FIG. 3 is a block diagram of a weather radar system, according to an exemplary embodiment.

Referring to FIG. 3, a block diagram of a weather radar system 300 is shown, according to an exemplary embodiment. Weather radar system 300 is shown to include a weather radar antenna 310 connected (e.g., directly, indirectly) to an antenna controller and receiver/transmitter circuit 302. Antenna controller and receiver/transmitter circuit 302 may include any number of mechanical or electrical circuitry components or modules for steering a radar beam. For example, circuit 302 may be configured to mechanically tilt the antenna in a first direction while mechanically rotating the antenna in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent antenna apertures, etc.). Circuit 302 may be configured to conduct the actual signal generation that results in a radar beam being provided from weather radar antenna 310 and to conduct the reception of returns received at radar antenna 310. Radar return data is provided from circuit 302 to processing electronics 304 for processing. For example, processing electronics 304 can be configured to interpret the returns for display on display 20.

Processing electronics 304 can also be configured to provide control signals or control logic to circuit 302. For example, depending on pilot or situational inputs, processing electronics 304 may be configured to cause circuit 302 to change behavior or radar beam patterns. In other words, processing electronics 304 may include the processing logic for operating weather radar system 300. It should be noted that processing electronics 304 may be integrated into radar system 300 or located remotely from radar system 300, for example, in aircraft control center 10.

Processing electronics 304 are further shown as connected to aircraft sensors 314 which may generally include any number of sensors configured to provide data to processing electronics 304. For example, sensors 314 could include temperature sensors, humidity sensors, infrared sensors, altitude sensors, a gyroscope, a global positioning system (GPS), or any other aircraft-mounted sensors that may be used to provide data to processing electronics 304. It should be appreciated that sensors 314 (or any other component shown connected to processing electronics 304) may be indirectly or directly connected to processing electronics 304. Processing electronics 304 are further shown as connected to avionics equipment 312. Avionics equipment 312 may be or include a flight management system, a navigation system, a backup navigation system, or another aircraft system configured to provide inputs to processing electronics 304.

Figure 4:
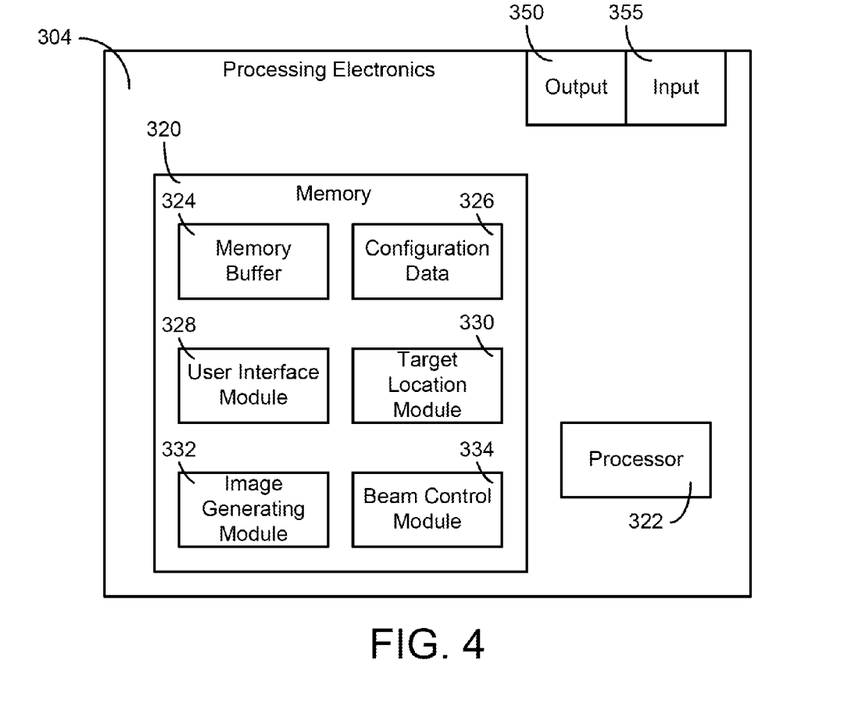
FIG. 4 is a block diagram of the processing electronics of the weather radar system of FIG. 3, according to an exemplary embodiment.

Referring to FIG. 4, a detailed block diagram of processing electronics 304 of FIG. 3 is shown, according to an exemplary embodiment. Processing electronics 304 includes a memory 320 and processor 322. Processor 322 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 322 is configured to execute computer code stored in memory 320 to complete and facilitate the activities described herein. Memory 320 can be any volatile or non-volatile memory device capable of storing data or computer code relating to the activities described herein. For example, memory 320 is shown to include modules 328-334 which are computer code modules (e.g., executable code, object code, source code, script code, machine code, etc.) configured for execution by processor 322. When executed by processor 322, processing electronics 304 is configured to complete the activities described herein. Processing electronics 304 includes hardware circuitry for supporting the execution of the computer code of modules 328-334. For example, processing electronics 304 includes hardware interfaces (e.g., output 350) for communicating control signals (e.g., analog, digital) from processing electronics 304 to circuit 302 or to display 20. Processing electronics 304 may also include an input 355 for receiving, for example, radar return data from circuit 302, feedback signals from circuit 302 or for receiving data or signals from other systems or devices.

Memory 320 includes a memory buffer 324 for receiving radar return data. The radar return data may be stored in memory buffer 324 until buffer 324 is accessed for data. For example, a user interface module 328, target location module 330, image generating module 332, beam control module 334, or another process that utilizes radar return data may access buffer 324. The radar return data stored in memory 320 may be stored according to a variety of schemes or formats. For example, the radar return data may be stored in an x,y or x,y,z format, a heading-up format, a north-up format, a latitude-longitude format, or any other suitable format for storing spatial-relative information.

Memory 320 further includes configuration data 326. Configuration data 326 includes data relating to weather radar system 300. For example, configuration data 326 may include beam pattern data which may be data that a beam control module can interpret to determine how to command circuit 302 to sweep a radar beam. For example, configuration data 326 may include information regarding maximum and minimum azimuth angles of horizontal radar beam sweeps, azimuth angles at which to conduct vertical radar beam sweeps, timing information, speed of movement information, and the like. Configuration data 326 may also include data, such as threshold values, model information, look up tables, and the like used by modules 328-334 to determine and display the altitude value of an echo top of a weather cell.

Memory 320 is further shown to include a user interface module 328 which includes logic for interpreting signals and/or data received from a user interface (e.g., user input device, cursor control device, keyboard or keypad, touchscreen, etc.). For example, user interface module 328 may be configured to interpret signals from a user input device as coordinates (e.g., latitude and longitude, direction and distance, etc.). For example, user interface module 328 may be configured to interpret user input data to determine the location of a cursor on a display 20 and the relationship between the cursor and an image on the display 20. For example, user interface module 328 may be configured to interpret user input data to determine various gestures (e.g., drag versus swipe versus tap), the direction of gestures, the relationship of these gestures to images, and the location of these gestures on a touch sensitive surface 22. User interface module 328 may include touchscreen operational data which may be data regarding the size, resolution, and sensitivity of a touchscreen, and the like, which can be used to interpret user input data from memory buffer 324 or a touch sensitive surface 22 on display 20. For example, user interface module 328 may be configured to provide information (e.g., cursor information) to image generating module 332. User interface module 328 may further be configured to convert a target selection by a user into data usable by target location module 330 (e.g., x,y format, grid location, or other suitable spatial relationship format) and to provide the data to target location module 330.

Memory 320 is further shown to include a target location module 330 which includes logic for using data from user interface module 328 and transforming the data into target information usable by beam control module 334 or circuit 302 to direct a radar beam toward the target. For example, target location module 330 may be configured to receive image information from image generating module 332 and to correlate the image information with target selection data received from user interface module 328, thereby calculating a relative location of the target to aircraft 101. Target location module 330 may be further configured to derive the absolute location of the target based on an absolute location of aircraft 101, a heading of aircraft 101, and a relative location of the target to aircraft 101. According to another embodiment, target location module 330 may be configured to generate target information including direction and distance coordinates oriented to the aircraft from latitudinal and longitudinal coordinates received from user interface module 328. Target location module 330 may be configured to provide target location information to beam control module 334.

Memory 320 is further shown to include an image generating module 332 which includes logic for using radar returns in memory buffer 324 to generate an image of the weather. For example, image generating module 332 may use radar returns to generate a plan view of weather detected by radar system 300. Image generating module 332 may be configured to receive an echo top altitude value from memory buffer 324 or radar system 300 and to generate an image including the altitude value and a plan view of the weather. Image generating module 332 may be configured to cause the image to be displayed on an aviation display 20. Image generating module 332 may further be configured to integrate or overlay the altitude value onto the plan view of the weather in a region of the plan view corresponding to the selected target. Image generating module 332 may include operational data including information regarding size, resolution, refresh rates, and orientation of aviation displays 20.

Memory 320 is further shown to include a beam control module 334 which includes logic for providing target location information to circuit 302. For example, beam control module 334 may be an algorithm for commanding circuit 302 to sweep a radar beam. Beam control module 334 may be used, for example, to send one or more analog or digital control signals to circuit 302. The control signals may be, for example, an instruction to move the antenna mechanically, an instruction to conduct an electronic beam sweep in a certain way, an instruction to move the radar beam to the left by five degrees, etc. Beam control module 334 may be configured to control timing of the beam sweeps or movements relative to aircraft speed, flight path information, transmission or reception characteristics from weather radar system 300 or otherwise. Beam control module 334 may receive data from configuration data 326 for configuring the movement of the radar beam. Beam control module 334 may further be configured to cause radar system 300 to scan and/or track the target.

Figure 5:
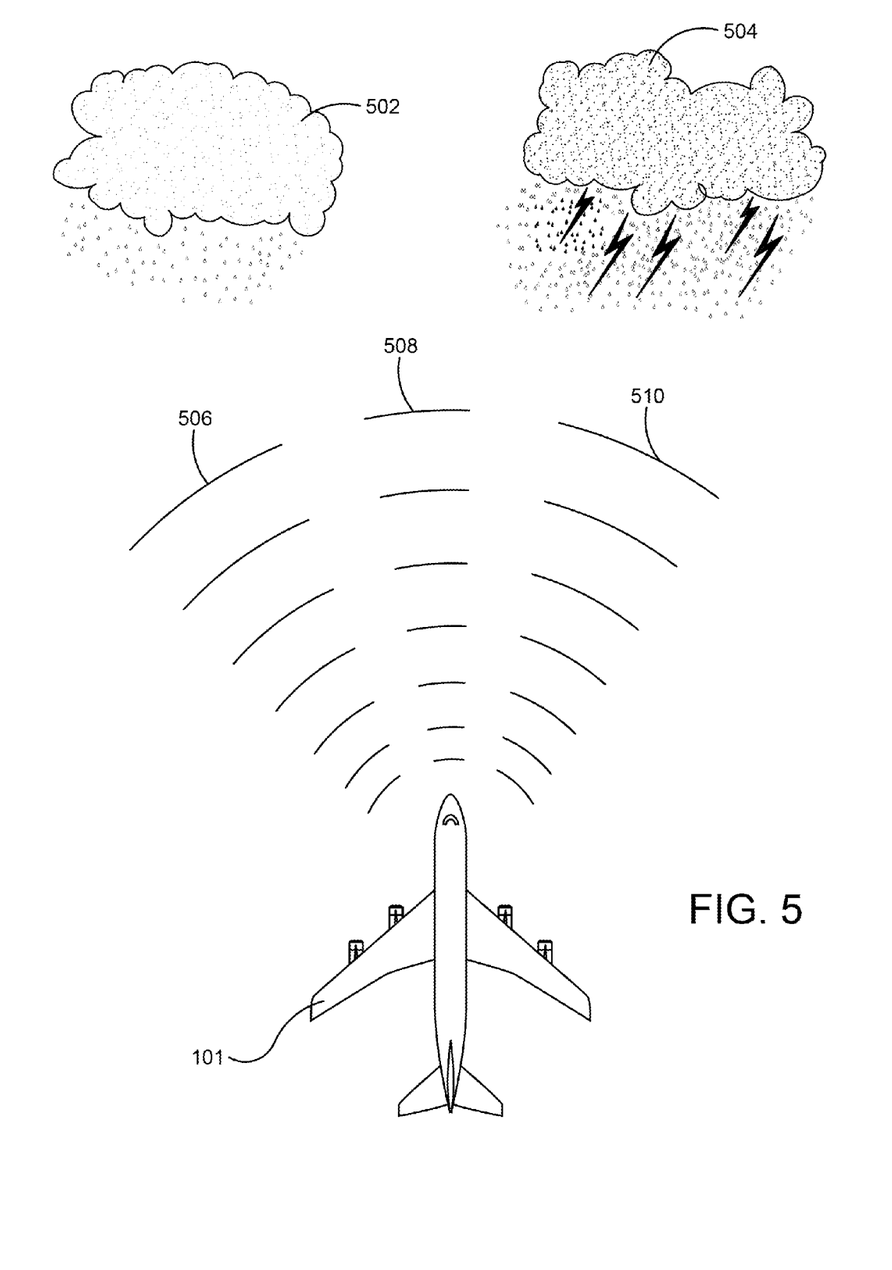
FIG. 5 is a schematic plan view illustration of an aircraft radar system scanning weather, according to an exemplary embodiment.

Referring to FIGS. 5-8, use of the systems and methods disclosed herein will be described, according to an exemplary embodiment. FIG. 5 shows an illustration of aircraft 101 utilizing radar system 300 to transmit first, second, and third radio frequency waves, shown as left radio frequency wave 506, center radio frequency wave 508, and right radio frequency wave 510, respectively. Left radio frequency wave 506 contacts a first (e.g., left) weather cell 502 and reflects back to aircraft 101 as a radar return. Similarly, right radio frequency wave 510 contacts a second (e.g., right) weather cell 504 and reflects back to aircraft 101 as another radar return. Center radio frequency wave 508 does not contact a reflective object and, thus, does not generate a radar return. It should be noted that, while radio frequency waves are described, radar system 300 may use other beam types (e.g., microwave, Lidar, etc.).

Figure 6:
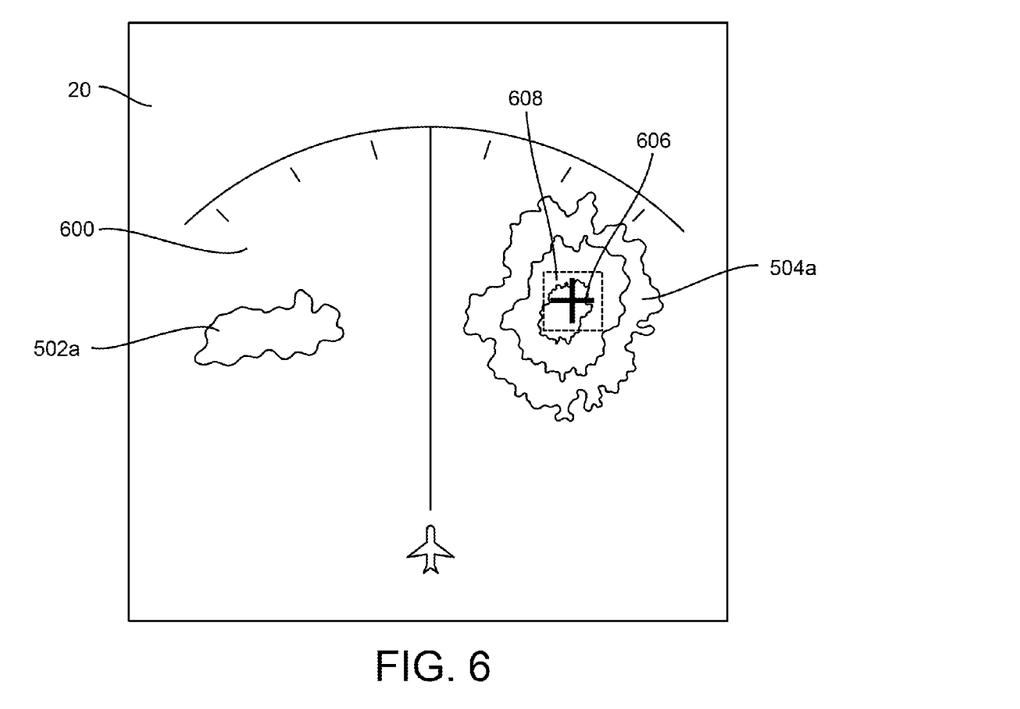
FIG. 6 is a schematic illustration of an aviation display showing a plan view of weather, according to an exemplary embodiment.

Referring to FIG. 6, components of processing electronics 304, for example image generating module 332, may be configured to generate an image 600 of a plan view of the weather and to cause image 600 to be displayed on aviation display 20. As shown, image 600 comprises left cell 502a and right cell 504a, which correspond to left weather cell 502 and right weather cell 504, respectively. A user (e.g., pilot, co-pilot, crew member, technician, etc.) desiring vertical information about weather cell 504 may select or identify weather cell 504 or right cell 504a by providing a target selection, weather cell selection, location information, direction and/or distances coordinates, an absolute location of the weather cell, latitudinal and/or longitudinal coordinates, and/or position or region of the target on display 20. For example, the user may use keypad 52 to select a cell using latitudinal and longitudinal coordinates. The user may receive these coordinates, for example, from a weather report or through communication with another aircraft. According to another embodiment, the user may use keypad 52 to enter a direction and/or distance relative to aircraft 101, for example, +15 degrees and 20 nautical miles. According to the embodiment shown, the user may use a user input device (e.g., touch sensitive surface 22 on a display 20, cursor control device 50, etc.) to select a target or region 608 on image 600. According to one embodiment, cursor 606 may move around image 600 in response to user input via cursor control device 50. When cursor 606 is shown on the desired target (e.g., right weather cell 504, right cell 504a), the user may select the target, for example, by pressing a button on cursor control device 50. According to another embodiment, cursor 606 may move around image 600 in response to user input via touch sensitive surface 22. For example, a user may drag cursor 606 to a position or over right cell 504a, and the user may select the target by performing a gesture in relation to right cell 504a (e.g., lifting off of, or tapping, the touch sensitive surface 22), or pressing a button (e.g., bezel button proximate display 20, or button on cursor control device 50). According to yet another embodiment, the user may select the desired target by performing a gesture in relation to the target (e.g., tapping or double-tapping right cell 504a).

According to an exemplary embodiment, processing electronics 304 receives the user selection of right cell 504a from the user input device. For example, user interface module 328 may receive coordinates or a position on display 20 of a gesture or cursor 606. Processing electronics 304, e.g., target location module 330, may generate target information from the user input received from the user input device. Processing electronics 304 provides target information to weather radar system 300 usable by radar system 300 to scan the target. For example, beam control module 334 may provide a direction and/or distance to weather cell 504 or may provide latitudinal and longitudinal coordinates of weather cell 504.

Figure 7:
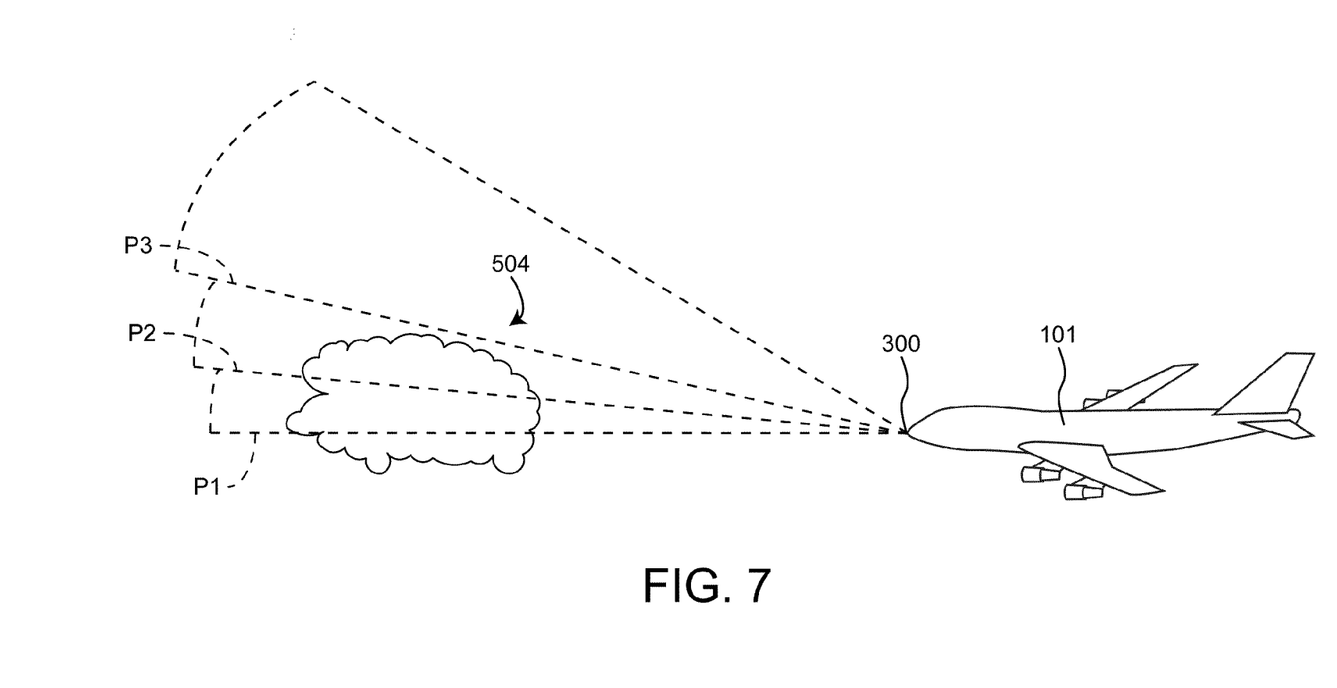
FIG. 7 is a schematic elevation view illustration of an aircraft scanning a weather cell, according to an exemplary embodiment.

Referring to FIG. 2 and to FIG. 7, which shows a schematic elevation view illustration of aircraft 101 scanning weather cell 504, according to an exemplary embodiment, radar system 300 conducts a first horizontal sweep, projecting a first beam in plane P1 and generating a first set of radar return data. Radar system 300 then adjusts the tilt angle 108 upward and conducts a second horizontal sweep, projecting the second beam in plane P2 and generating a second set of radar return data. Radar system 300 may then adjust the tilt angle 108 upward again and conduct a third horizontal sweep, projecting the third beam in plane P3. Plane P3 is above weather cell 504 and does not generate radar return data. According to various embodiments, radar system 300 may adjust tilt angle 108 upwards or downward (e.g., recursively) until the horizontal sweep passes through the echo top of the cloud. Radar system 300 and/or processing electronics 304 may infer (e.g., interpolate, extrapolate, model, etc.) the altitude of the echo top from two sets of radar return data. According to various embodiments, the user may have selected a target that is below aircraft 101. Accordingly, the first horizontal sweep may not generate radar return data, and radar system 300 may adjust the tilt angle 108 downwards for subsequent horizontal sweeps until the echo top of weather cell 504 is identified. According to another embodiment, radar system 300 may conduct one or more vertical sweeps to determine the altitude of the echo top of weather cell 504. The vertical sweeps may include sweeping the tilt angle 108 along a vertical plane, and conducting the sweeps at space apart horizontal angles. Radar system 300 and/or processing electronics 304 may determine the altitude of the echo top based on the tilt angle 108 of the radar system 300, the distance to the target, and an altitude of aircraft 101, which may be received from avionics equipment 312. One system and method for characterizing the altitude of the echo top of a weather cell that may be used with radar system 300 is described in U.S. Pat. No. 7,307,577 to Kronfeld et al., the entirety of which is hereby incorporated by reference.

Figure 8:
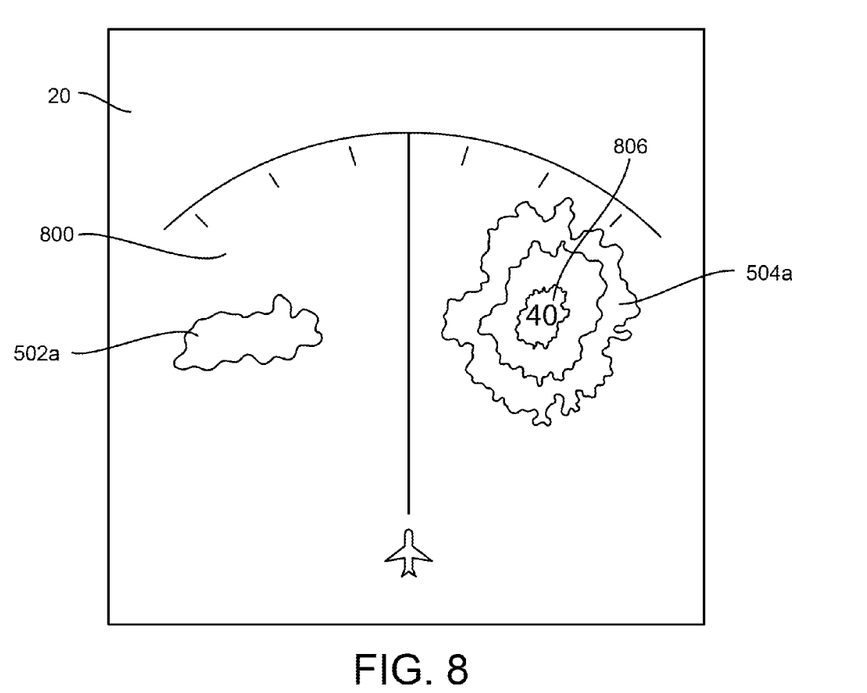
FIG. 8 is a schematic illustration of an aviation display showing a plan view of weather and an altitude of the echo top of a weather cell, according to an exemplary embodiment.

Referring to FIG. 8, a schematic illustration of an aviation display showing a plan view of weather and an altitude of the echo top of a weather cell is shown, according to an exemplary embodiment. Processing electronics 304 receives an altitude value of the echo top of weather cell 504. For example, image generating module 332 may receive the altitude value from circuit 302, from memory buffer 324, or from another module within processing electronics 304 or weather radar system 300. Processing electronics 304 then generates an image 800 including the altitude value 806 of the echo top of weather cell 504 and a plan view of the weather. Altitude value 806 may be integrated into the image of the weather or may be an overlay on the plan view of the weather. According to various embodiments, altitude value 806 may be a numerical value relating to the altitude of the echo top and may be displayed on a region of display 20 corresponding to the location information of the target, may be shown on a region of the plan view corresponding to the location of weather cell 504 (e.g., right cell 504a), and/or may be shown on a region of the plan view corresponding to the echo top of weather cell 504. According to the embodiment shown, altitude value 806 is displayed on the plan view of the weather in a region proximate the position selected by cursor 606 and comprises the altitude of the echo top of weather cell 504 in thousands of feet (e.g., "40" indicates that the echo top is approximately 40,000 feet above sea level).

The altitude value 806 shown on image 800 may remain static or may move along image 800 relative to the movement of aircraft 101. According to one embodiment, processing electronics 304 may cause radar system 300 to rescan weather cell 504 and then update image 800 with an updated altitude value of the echo top of weather cell 504. According to another embodiment, processing electronics 304 may cause radar system 300 to track weather cell 504 and then update the altitude value 806 as image 800 is updated data. According to another embodiment, a user may select or identify, as described in relation to FIG. 6, another target (e.g., left weather cell 502). Processing electronics 304 may then receive an altitude value of the echo top of the new target and generate an image showing the new altitude value on the new plan view image of the weather. The new image may include only the new altitude value or may include both the new altitude value and the previously selected altitude value, each displayed in regions of the plan view corresponding to their respective echo top locations.

Figure 9:
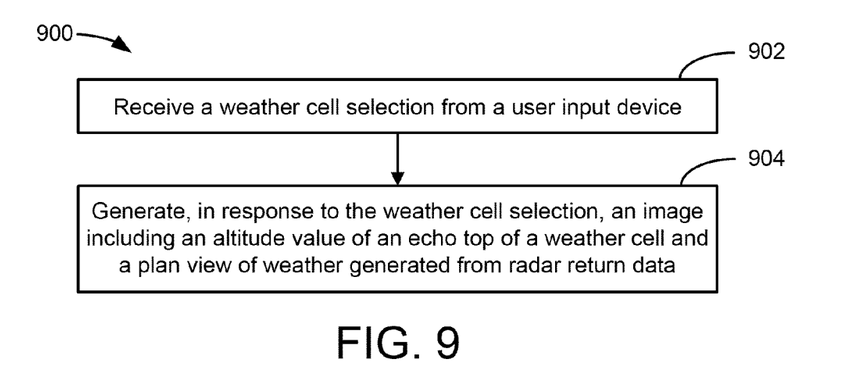
FIG. 9 is a flowchart of a process for displaying vertical weather information on an aircraft horizontal weather display, according to an exemplary embodiment.

Referring to FIG. 9, a flowchart of a process 900 for displaying vertical weather information on an aircraft horizontal weather display is shown, according to an exemplary embodiment. Process 900 is shown to include the steps of receiving a weather cell selection from a user input device (step 902) and generating, in response to the weather cell selection, an image including an altitude value of an echo top of a weather cell and a plan view of weather generated from radar return data (step 904).

Figure 10:
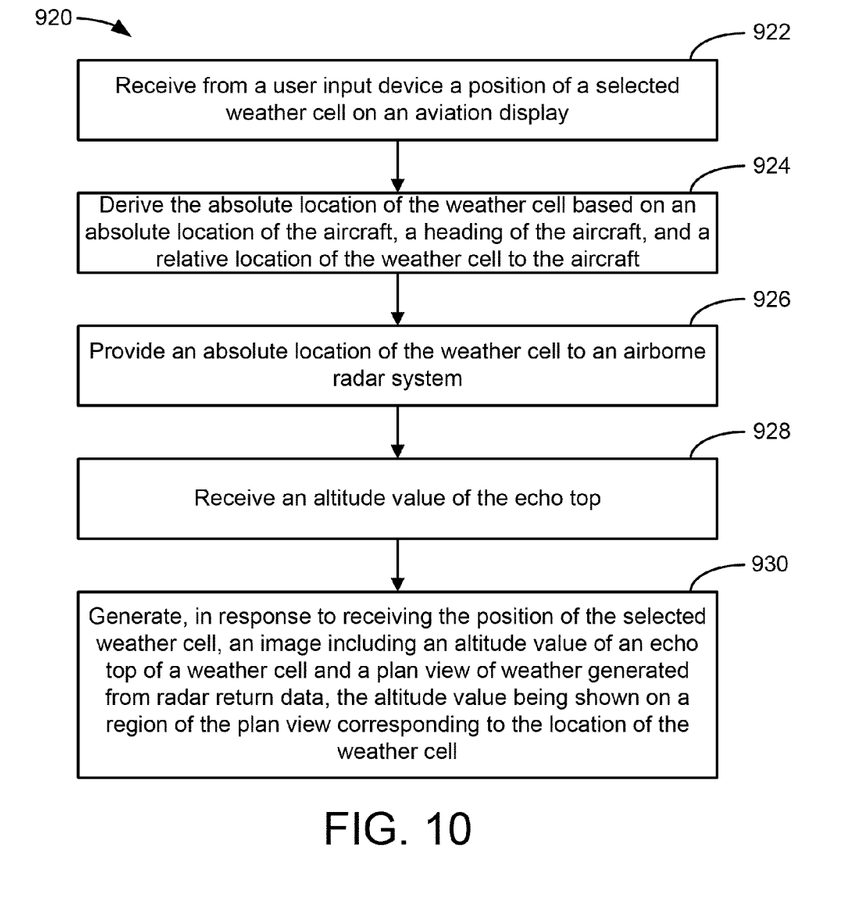
FIG. 10 is a flowchart of a process for displaying vertical weather information on an aircraft horizontal weather display, according to another embodiment.

Referring to FIG. 10, a flowchart of a process 920 for displaying vertical weather information on an aircraft horizontal weather display is shown, according to another embodiment. Process 920 is shown to include the steps of receiving from a user input device a position of a selected weather cell (e.g., right cell 504a) on an aviation display 20 (step 922); deriving the absolute location of the weather cell 504 based on an absolute location of the aircraft 101, a heading of the aircraft 101, and a relative location of the weather cell 504 to the aircraft 101 (step 924); and providing an absolute location of the weather cell 504 to an airborne radar system 300 (step 926). Process 920 is further shown to include the steps of receiving an altitude value of the echo top (step 928) and generating, in response to receiving the position of the selected weather cell, an image 800 including an altitude value 806 of an echo top of a weather cell 504 and a plan view of weather generated from radar return data, the altitude value 806 being shown on a region of the plan view corresponding to the location of the weather cell (e.g., right cell 504a) (step 930).

Various alternate embodiments of process 920 are contemplated. For example, process 920 may not receive a position of a selected weather cell 504a on aviation display 20 (step 922), but may instead receive an absolute location of the weather cell 504 from the user input device. For example, a user may enter latitudinal and longitudinal coordinates of the weather cell 504 into the user input device. Accordingly, process 920 would not need to derive the absolute location of the weather cell 504 (step 924), and step 924 could be deleted.

Figure 11:
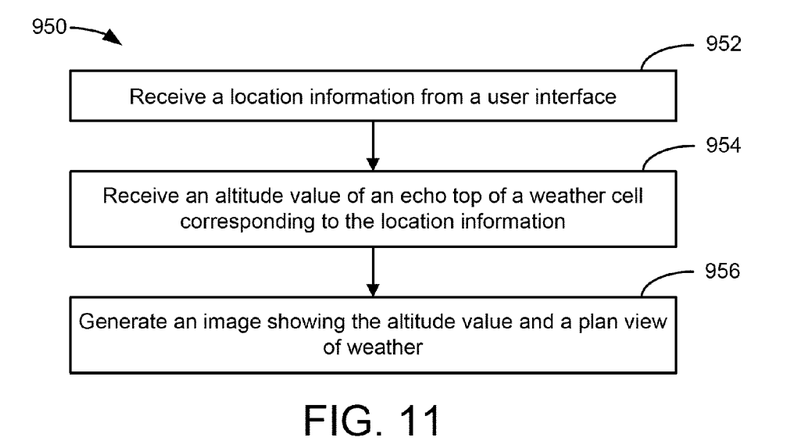
FIG. 11 is a flowchart of a process for displaying echo top information on an aviation display, according to an exemplary embodiment.

Referring to FIG. 11, a flowchart of a process 950 for displaying echo top information on an aviation display is shown, according to an exemplary embodiment. Process 950 is shown to include the steps of receiving a location information from a user interface (step 952), receiving an altitude value of an echo top of a weather cell corresponding to the location information (step 954), and generating an image showing the altitude value and a plan view of weather (step 956).

Figure 12:
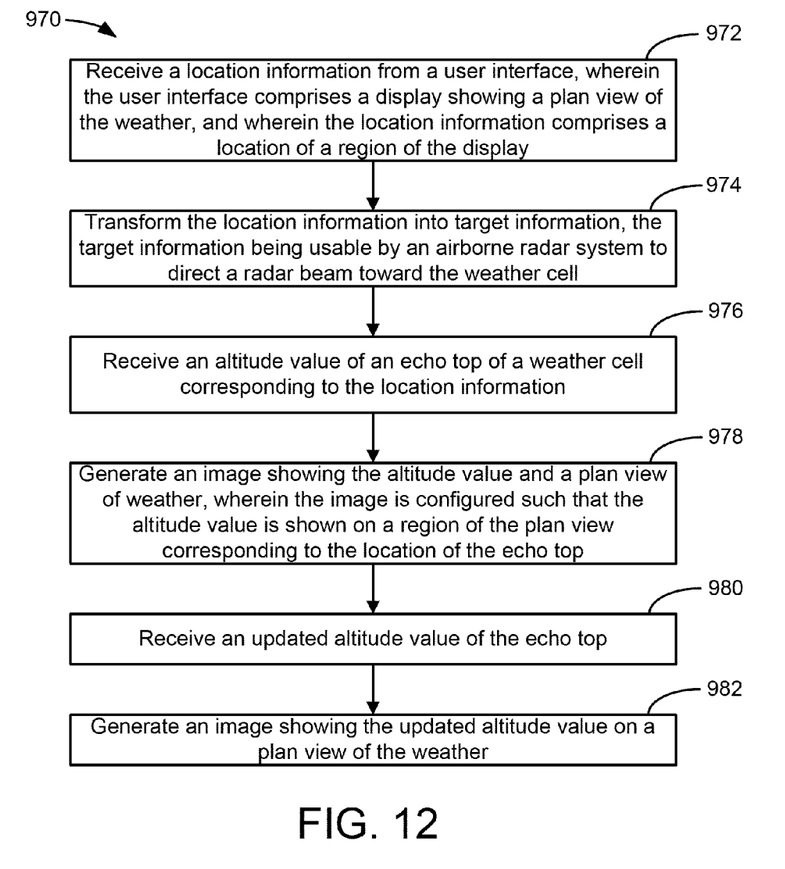
FIG. 12 is a flowchart of a process for displaying echo top information on an aviation display, according to another embodiment.

Referring to FIG. 12, a flowchart of a process 970 for displaying echo top information on an aviation display is shown, according to another embodiment. Process 970 is shown to include the step of receiving a location information from a user interface, wherein the user interface includes a display 20 showing a plan view of the weather (e.g., image 600), and wherein the location information includes a location of a region 608 of the display 20 (step 972). The location information may then be transformed into target information, the target information being usable by an airborne radar system 300 to direct a radar beam toward the weather cell 504 (step 974). Process 970 is shown to further include the steps of receiving an altitude value of an echo top of a weather cell 504 corresponding to the location information (step 976) and generating an image 800 showing the altitude value 806 and a plan view of weather, wherein the image 800 is configured such that the altitude value 806 is shown on a region 608 of the plan view corresponding to the location of the echo top (step 978). Process 970 is further shown to include the steps of receiving an updated altitude value of the echo top (step 980) and generating an image showing the updated altitude value on a plan view of the weather (step 982).

Various alternate embodiments of process 970 are contemplated. For example, process 970 may not receive a location of a region 608 of the display 20 (step 972), but may instead receive an coordinates of the weather cell 504 from the user interface. For example, a user may enter a direction and distance to the weather cell 504 into the user interface. The direction and distance may be directly usable by radar system 300, in which case, process 970 would not need to transform the location information into target information (step 974), and step 974 could be deleted. Alternatively, step 974 may transform the direction and distance coordinates into latitudinal and longitudinal coordinates usable by radar system 300. According to one embodiment, latitudinal and longitudinal coordinates may be received from the user interface and may be converted to direction and distance coordinates. According to another embodiment, process 970 may not include the steps of receiving an updated altitude value (step 980) and generating an updated image (step 982).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for displaying vertical weather information on an aviation display aboard an aircraft, the aircraft including an aircraft radar system for scanning a target weather cell, the system comprising:
   a memory device; and
   processing electronics coupled to the memory device and comprising a processor, an input, and an output, the processing electronics configured:
   to receive via the input a target weather cell selection from a user input device, wherein the target weather cell selection comprises a location information of the target weather cell;
   to generate via the processor a target information from the location information, the target information comprising direction and distance coordinates oriented to the aircraft;
   to provide via the output the target information to an aircraft radar system;
   to provide an altitude value of an echo top of the target weather cell based on radar return data stored in the memory device, and
   to cause via the output the altitude value to be displayed on a plan view of weather images on an aviation display in response to the received target weather cell selection.

2. The system of claim 1, wherein the altitude value of the echo top of the target weather cell is displayed on a region of the plan view of weather on the aviation display corresponding to the location of the echo top of the target weather cell.

3. The system of claim 1, wherein the location information comprises latitudinal and longitudinal coordinates.

4. The system of claim 1, wherein the processing electronics are further configured to cause the aircraft radar system to track the weather cell.

5. The system of claim 1, wherein the processing electronics are further configured to cause an updated altitude of the echo top to be displayed on the aviation display in response to a second scan of the target.

6. A method for displaying vertical weather information on an aircraft horizontal weather display, comprising:
   generating an image of a plan view of weather generated from radar return data stored in a memory, the plan view of weather comprising a plurality of weather cells;
   causing the image to be displayed on an aircraft horizontal weather display;
   receiving at a processor a weather cell selection from a user input device, the weather cell selection comprising one of the plurality of weather cells; and
   updating, in response to the weather cell selection, the image to include an altitude value of an echo top of the selected weather cell and the plan view of weather generated from radar return data, wherein receiving the weather cell selection from a user input device comprises receiving an absolute location of the weather cell from the user input device.

7. The method of claim 6 further comprising updating the image such that the altitude value is shown on a region of the plan view representing the location of the weather cell.

8. A method for displaying vertical weather information on an aircraft horizontal weather display, the method comprising:
   generating an image of a plan view of weather generated from radar return data stored in a memory, the plan view of weather comprising a plurality of weather cells;
   causing the image to be displayed on an aircraft horizontal weather display;
   receiving at a processor a weather cell selection from a user input device, the weather cell selection comprising one of the plurality of weather cells; and
   updating, in response to the weather cell selection, the image to include an altitude value of an echo top of the selected weather cell and the plan view of weather generated from radar return data;
   wherein receiving the weather cell selection from a user input device comprises receiving an absolute location of the weather cell from the user input device.

9. The method of claim 6, wherein receiving the weather cell selection from a user input device comprises receiving from the user input device a latitude or longitude position of the weather cell on the aviation display.

10. The method of claim 9 further comprising deriving an absolute location of the weather cell based on an absolute location of the aircraft, a heading of the aircraft, and a relative location of the weather cell to the aircraft.

11. The method of claim 8 further comprising providing the absolute location of the weather cell to an airborne radar system.

12. The method of claim 6 further comprising receiving the altitude value of the echo top.

13. One or more computer readable media having instructions stored therein, the instructions being executable by one or more processors to execute a method of displaying echo top information on an aviation display, the method comprising:
   receiving a location information from a user interface;
   receiving an altitude value of an echo top of a weather cell corresponding to the location information; and
   generating an image showing the altitude value and a plan view of weather, wherein the altitude value is shown on the plan view at a position representing the location of the echo top;
   wherein the echo top is a highest part of the cell having a reflectively above a threshold representative of a top of precipitation within the cell, wherein the location information comprises receiving at least one of a direction and distance to the weather cell.

14. The computer readable media of claim 13, wherein the method further comprises:
   receiving an updated altitude value of the echo top; and
   generating an image showing the updated altitude value on a plan view of the weather.

15. One or more computer readable media having instructions stored therein, the instructions being executable by one or more processors to execute a method of displaying echo top information on an aviation display, the method comprising:
   receiving a location information from a user interface;
   receiving an altitude value of an echo top of a weather cell corresponding to the location information; and
   generating an image showing the altitude value and a plan view of weather, wherein the altitude value is shown on the plan view at a position representing the location of the echo top;
   wherein the location information comprises receiving at least one of a direction and distance to the weather cell.

16. The computer readable media of claim 13, wherein the user interface comprises a display showing a plan view of the weather, and wherein the location information comprises a location of a region of the display.

17. One or more computer readable media having instructions stored therein, the instructions being executable by one or more processors to execute a method of displaying echo top information on an aviation display, the method comprising:
receiving a location information from a user interface;
receiving an altitude value of an echo top of a weather cell corresponding to the location information;
generating an image showing the altitude value and a plan view of weather, wherein the altitude value is shown on the plan view at a position representing the location of the echo top; and
transforming the location information into target information, the target information being usable by an airborne radar system to direct a radar beam toward the weather cell.

18. A method for displaying vertical weather information on an aircraft horizontal weather display, comprising:
generating an image of a plan view of weather generated from radar return data stored in a memory, the plan view of weather comprising a plurality of weather cells;
causing the image to be displayed on an aircraft horizontal weather display;
receiving at a processor a weather cell selection from a user input device, the weather cell selection comprising one of the plurality of weather cells; and
updating, in response to the weather cell selection, the image to include an altitude value of the selected weather cell and the plan view of weather generated from radar return data
receiving at the processor a second weather cell selection from a user input device, the second weather cell selection comprising a second of the plurality of weather cells; and
updating, in response to the weather cell selection, the image to include an altitude value of an echo top of the second selected weather cell, the altitude value of the selected weather cell, and the plan view of weather generated from radar return data.

19. The method of claim 6, further comprising:
receiving at the processor a second weather cell selection from a user input device, the second weather cell selection comprising a second of the plurality of weather cells; and
updating, in response to the weather cell selection, the image to include an altitude value of an echo top of the second selected weather cell and the plan view of weather generated from radar return data, and to exclude the altitude value of the echo top of the selected weather cell.

20. A system for displaying vertical weather information on an aviation display aboard an aircraft, the aircraft including an aircraft radar system for scanning a target weather cell, the system comprising:
a memory device; and
processing electronics coupled to the memory device and comprising a processor, an input, and an output, the processing electronics configured:
to receive via the input a target weather cell selection from a user input device, wherein the target weather cell selection comprises a location information of a target portion of a weather cell;
to generate via the processor a target information from the location information, the target information comprising direction and distance coordinates oriented to the aircraft;
to provide via the output the target information to an aircraft radar system;
to provide an altitude value of an echo top of the target portion of the weather cell based on radar return data stored in the memory device; and
to cause via the output, in response to the received target weather cell selection, the altitude value to be displayed on a region representing the location information on a plan view of weather images on an aviation display.

* * * * *